United States Patent Office 3,458,496
Patented July 29, 1969

3,458,496
REACTIVE MONOAZO DYES CONTAINING
2,4-DIHALOPYRIMIDINE GROUPS
Jacques Guenthard, Binningen, Basel-Land, Switzerland, assignor to Sandoz Ltd. (also known as Sandoz A.G.), Basel, Switzerland
No Drawing. Filed May 1, 1964, Ser. No. 364,306
Claims priority, application Switzerland, May 9, 1963, 5,819/63; July 5, 1963, 8,379/63
Int. Cl. C09b 45/04
U.S. Cl. 260—146
13 Claims The invention relates to fiber-reactive organic water-soluble dyes. These dyes have from one to four water-solubilizing groups, preferably salt-forming groups, such as the carboxylic acid, sulfonic acid, sulfuric ester and acylated sulfonamide groups and may contain other groups with weak water-solubilizing character, such as hydroxy and optionally monoalkylated or monoarylated sulfonamide groups. The organic structure which provides the color is noncritical and can be from any class, e.g., stilbene, azine, oxazine, dioxazine, thiazine, thiazole, quinoline, triphenylmethane, diphenylnaphthylmethane, but preferably nitro, formazane, phthalocyanine, anthraquinone and azo. The water-solubilizing groups and the fiber-reactive group or groups, independently may be in any available positions in the structure, bound either to aliphatic or aromatic groups themselves with or without dyestuff character.

The reactive group of this invention is the grouping of the formula

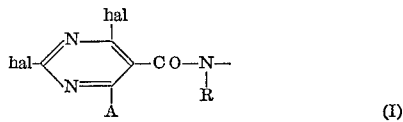

(I)

wherein hal is halogen atom with an atomic number from 17 to 35, inclusive, i.e., is chlorine or bromine,
A is either a hydrogen atom or a methyl group, and
R is either a hydrogen atom or an optionally substituted alkyl group.

When R is an optionally substituted alkyl group, it preferably contains from 1 to 5 carbon atoms and is, e.g., methyl, ethyl, propyl, butyl, n-amyl, isopropyl, isobutyl, isoamyl, 2-hydroxyethyl, 2- or 3-hydroxypropyl, 2-ethoxy-ethyl, 3-methoxy-propyl or 2-chloroethyl or it is a benzyl or phenylethyl radical.

The process for the production of these reactive dyes consists in the acylation of a dye containing at least one acylizable amino group in the molecule or of an organic compound capable of dye formation and containing at least one acylizable amino group in the molecule with a 2,4-dihalogenopyrimidine-5-carboxylic acid halide of the formula

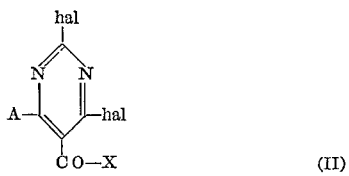

(II)

wherein

A and hal have the afore-cited meanings, and
X a halogen atom with an atomic number from 17 to 35, inclusive, i.e., is chlorine or bromine, with subsequent transformation of the reaction products, when they are capable of dye formation, into dyes by an azo coupling or condensation reaction.

As stated above the starting dyes can belong to different classes, preferably they are members of the mono-, dis- or poly-azo, anthraquinone, dioxazine, nitro, formazane or phthalocyanine series. The azo dyes can be either metal-free or metallizable, e.g., suitable for complexing with chromium or copper compounds, or they can be metal-containing or non-metallizable. Suitable metal-containing azo dye are the 1:1 copper and 1:1 nickel complex and the 1:2 chromium and 1:2 cobalt complex types. The phthalocyanine dyes used can contain any of the metals normally present as central atoms, e.g., copper, cobalt or nickel. The starting dyes bear at least one, but generally not more than three or four, salt-forming, water-solubilizing groups, e.g., sulfonic acid, carboxylic acid, sulfuric acid ester and acylated sulfonamide groups bound to the basic molecule of the dye either directly or through a hydrocarbon radical.

These dyes contain further one or, if desired, more than one, but generally not more than two, acylizable amino groups. These amino groups can be unsubstituted or monosubstituted, e.g., alkyl, hydroxyalkyl, alkoxyalkyl or halogenalkyl group, in which case the alkyl group contains preferably 1 to 5 carbon atoms. These acylizable amino groups can occupy any positions in the dye molecule. In azo dyes, e.g., they can be present in the diazo component, the coupling component or, in the case of disazo dyes, in the central component; in anthraquinone and phthalocyanine dyes they can be found directly to the dye molecule, i.e., to the anthraquinone nucleus, or to the benzene nuclei of the phthalocyanine molecule. The acylizable amino group is however preferably positioned on a substituent of this basic molecule, e.g., in phthalocyanines on an aliphatic or aromatic radical which is bound through a sulfonamide group to a benzene nucleus of the phthalocyanine molecule, and in anthraquinone dyes on a phenyl, phenylaminophenyl, diphenyl or phenylthiophenyl radical.

Especially suitable anthraquinone derivatives are the 1,4-diaminoanthraquinones in which at least one amino group is substituted by one of the afore-named radicals. The anthraquinones can contain in the nucleus further substituents, e.g., halogen atoms or hydroxyl, alkyl, alkylsulfonyl, arysulfonyl, hydroxyphenyl, alkoxyphenyl or phenyloxy groups, and the same applies to the dyes of other classes. The groups of dyes referred to on pages 1 to 6 in Swiss Patent 359,228 and the azo, anthraquinone and phthalocyanine dyes containing amino groups as well as the components for the production of these dyes which are named in French Patent 1,247,660 are examples of suitable starting dyes.

The pyrimidine derivatives of Formula II are preferably 2,4-dichloropyrimidine-5-carboxylic acid chloride, 2,4-dichloro-6-methylpyrimidine-5 - carboxylic acid chloride or the corresponding bromo derivatives.

The 2,4-dihalogenopyrimidine-5-carboxylic acid halides of Formula II can be condensed with a dye bearing a acylizable amino group or with a component serving for the synthesis of such a dye. In the latter case the dye is formed in the normal way, e.g., by condensation, or with azo dyes by coupling. For this purpose a compound containing at least one readily acylizable amino group and one poorly acylizable, but diazotizable, amino group can be acylated with a 2,4-dihalogenopyrimidine-5-carboxylic acid halide of Formula II, the intermediate diazotized and the diazo compound coupled with a coupling component to give a water-soluble dye. When diamines are used containing two identical reactive amino groups, e.g., 1,3- or 1,4-diaminobenzene, it is best to work in a reaction medium in which the diamine is readily soluble, while the monocondensation product is poorly soluble to insoluble; so it is precipitated immediately upon formation and is not available for further acylation. Suitable coupling components are, e.g., phenolic hydroxy compounds such as mono- and di-hydroxybenzenes; mono- and di-hydroxynaphthalenes which can contain further substituents, e.g., amino, alkylamino (methylamino), arylamino (phenylamino), acylamino, alkyl, alkoxy groups, halogen atoms and, in the case of naphthalene derivatives, especially sulfonic acid groups; enolic hydroxy compounds, such as pyrazolones, acylacetylamino derivatives, preferably 1-aryl-3-methyl- or 1-aryl-3-carboxy-5-pyrazolones, acetoacetylaminobenzenes, benzoylacetylaminobenzenes, acetocetylaminonaphthalenes or acetoacetylaminonaphthalenes containing substituents such as alkyl or alkoxy groups, halogen atoms or preferably sulfonic acid groups; barbituric acid; compounds which are capable of reacting twice with diazonium salts with formation of formazane dyes, such as cyclohexanone, levulinic acid, malonic acid derivatives, cyanacetic acid, acetylmethyl- or carboxymethyl-sulfonyl-benzene or -naphthalene and their sulfonic acids; amino compounds, such as aminobenzenes, coupling in para position to the amino group, preferably unsubstituted or substituted N,N-dialkylbenzenes; aminonaphthalenes which couple in ortho position to the amino group and may be monoalkylated or monoarylated and can contain further substituents, e.g., hydroxyl groups and/or sulfonic acid groups, 5-amino-pyrazolones, etc.

Compounds having at least one acylizable amino group and one carbon atom capable of coupling, e.g., aminohydroxy compounds (aminohydroxybenzenes and aminohydroxynaphthalenes and their sulfonic acids), aminoenol compounds (aminoarylpyrazolones, aminoacylacetylaminobenzenes and aminoacylacetylaminonaphthalenes and their sulfonic acids) and compounds capable of reacting twice with diazonium salts to form formazane dyes (aminocyclohexanone, 1-amino-3- and -4-carboxymethyl-sulfonyl- and -3- or -4-acetylmethylsulfonyl-benzenes or -naphthalenes) can be acylated with a 2,4-dihalogeno-pyrimidine-5-carboxylic acid halide of Formula II to give an intermediate which can be used as coupling component. The diazo compound obtained from a diazo component containing a 2,4-dihalogenopyrimidyl-5-carbonyl radical can, of course, be coupled with a coupling component which likewise contains a 2,4-dihalogenopyrimidyl-5-carbonyl radical.

Examples of organic compounds which are suitable for the synthesis of the water-soluble reactive dyes are: 1,3- and 1,4-diaminobenzenes, 1,3- and 1,4-diaminobenzenesulfonic acids and -carboxylic acids, 4,4'-diamino-1,1'-diphenyl-3-sulfonic acid, 1-(3'- or 4'-amino)-phenyl - 3-methyl-5-pyrazolones, aminohydroxynaphthalenes or preferably their sulfonic acids, e.g., 2-amino - 5 - hydroxynaphthalene-7-sulfonic acid, 2-amino-8-hydroxynaphthalene-6-sulfonic acid, 1-amino-8-hydroxynaphthalene - 4,6-disulfonic acid, 1-amino - 8 - hydroxynaphthalene - 3,6-disulfonic acid.

The monoacylamino-monoamino compounds obtained by monocondensation of diamines with a 2,4-dihalogeno-pyrimidine-5-carboxylic acid halide of Formula II can be converted into dyes by a further condensation, e.g., with an aldehyde, to give rise to a Schiff's base, or by reaction with the acid halide of a dye, preferably a carboxylic acid chloride or a sulfonic acid chloride (copperphthalocyanine-polysulfonic acid chloride). Ketomethylene compounds such as pyrazolones and acylacetylamino compounds having a 2,4-dihalogenopyrimidyl-5-carbonyl-amino group can be condensed with an aldehyde, preferably a substituted or unsubstituted N,N-dialkylamino-benzaldehyde, to give styryl dyes.

Acylation is carried out preferably in the aqueous solution of the alkali metal salts of dyes containing sulfonic acid groups, by the addition of the 2,4-dihalogeno-pyrimidine-5-carboxylic acid chloride. Approximately one mole of a compound of Formula II is employed to each mole of an amino group for acylation of the dyes or the intermediates. Fairly low temperatures are used for the operation, e.g., from about 0° to 50° C., or preferably from 0° to 25° C., advantageously with addition of compounds which neutralize mineral acids, suitable compounds for this purpose being, e.g., sodium hydroxide, sodium carbonate, sodium bicarbonate, sodium acetate and the corresponding potassium compounds.

The acylation in aqueous-organic or aqueous medium is conducted at a weakly alkaline, neutral to weakly acid reaction, preferably within the pH range of 7 to 3. The reaction temperature is adjusted to the reactivity of the starting products. To neutralize the hydrogen halide formed, an acid-binding agent, e.g., sodium acetate, is added to the solution or suspension at the beginning of the reaction, or small portions of sodium or potassium carbonate or bicarbonate in solid powder form or concentrated aqueous solution are added during the reaction. Aqueous solutions of sodium or potassium hydroxide are also suitable as neutralizing agents. The addition of small amounts of a wetting or emulsifying agent is capable of accelerating the reaction. When a purely organic medium is used it is of advantage to add to it a tertiary amine, e.g., dimethyl- or diethyl-aminobenzene, pyridine or a mixture of pyridine bases, as acid binding agent.

The acid halide can be added as such in concentrated form, but it is generally more advantageous to dissolve or suspend the acid halide in two to five times its amount of dioxane, benzene, chlorobenzene, methylbenzene, dimethylbenzene or acetone and to add this solution or suspension dropwise to the solution or suspension of the compound bearing the amino group in the presence of an acid-binding agent. The resulting acylation products are isolated from their aqueous solutions in the normal way, e.g., by precipitation, and carefully dried.

As the new dyes are highly reactive it is advisable to add to them a buffer salt or a mixture of buffering agents capable of keeping the pH value in the region of the neutral point, e.g., a mixture of phosphate buffers, so that the stability of the dry powder is increased in storage and also when it is present for application in padding liquors or printing pastes.

The new reactive dyes which contain two or more water-solubilizing groups, preferably sulfonic acid groups, have good solubility in water, good compatibility with salts and hard water, and good reactivity with vegetable fibers, animal fibers and synthetic polyamide fibers. They reserve acetate, triacetate, polyester, polyacrylonitrile, polyvinyl chloride, polyvinyl acetate and polyalkyene fibers. Owing to their good aqueous solubility the unfixed proportion of the dye is easily washed off the dyeings and prints on cellulosic fibers.

The reactive dyes of the invention containing only one or two water-solubilizing groups, preferably sulfonic acid groups, are well suitable for the exhaustion dyeing of cellulosic fibers and for the acid dyeing of wool, silk and synthetic polyamide fibers.

Compared with the dyes of French Patents 1,247,660 and 1,266,733 which are produced from a dye having one acylizable amino group and 2,6-dihalogenopyrimidine-4-carboxylic acid chloride, the new dyes have the advantage of being fixable at room temperature, i.e., they react with the fiber without heating and give dyeings stable to heat.

The reactive dyes of the invention are suitable, depending on their constitutions, for the dyeing of leather; the dyeing, padding and printing of fibers of animal origin, e.g., wool and silk, of synthetic polyamide fibers, e.g., nylon, "Perlon," "Rilsan" (registered trademarks), of cellulosic fibers, e.g., cotton and linen, of regenerated cellulosic fibers, e.g., viscose filament and staple fiber and cuprammonium rayon, and of blends and other articles of these fibers. The optimum conditions of application vary with the dyes used. Animal and synthetic polyamide fibres are best dyed, printed or fixed in an acid, neutral or weakly alkaline medium, e.g., in the presence of acetic acid, formic acid, sulfuric acid, ammonium sulfate, sodium metaphosphate, etc. Dyeing can be carried out in an acetic acid to neutral medium in the presence of leveling agents, e.g., polyoxyethylated fatty amines or mixtures of these and alkylpolyglycol ethers, and the bath adjusted to a neutral or weakly alkaline reaction at the end of dyeing by the addition of small amounts of an agent of alkaline reaction, e.g., ammonia, sodium carbonate and bicarbonate, or of compounds which react alkaline on heating, e.g., hexamethylene tetramine and urea. The dyed goods are then rinsed thoroughly and acidified with a little acetic acid if necessary.

The dyeings on wool and synthetic polyamide fibers have good light fastness and excellent fastness to perspiration, washing, water, sea water, milling, rubbing and dry cleaning, and a number have good leveling properties.

The dyeing, padding and printing or fixation of the dyes on cellulosic fibers is carried out advantageously in an alkaline medium, e.g., in the presence of sodium carbonate or bicarbonate, sodium hydroxide, potassium hydroxide, sodium metasilicate, sodium borate, trisodium phosphate and ammonia. To prevent reduction effects during dyeing, padding or printing, or it is advisable to add a mild oxidizing agent, e.g., sodium 1-nitrobenzene-3-sulfonate. The dyes can be fixed on cellulosic fibers without heating, i.e., at room temperature, or at a moderate temperature, e.g., 20–40° C.

The dyeings and prints on cellulosic fibers have excellent fastness to wet treatments, e.g., washing, perspiration, water, sea water, rubbing, acids (acetic acid, tartaric acid), alkali, acetic acid cross-dyeing and dry cleaning, and are stable to alkaline hydrolytic influences. These properties are due to the formation of a stable chemical linkage between the dye molecule and the cellulose molecule. Often the entire amount of dye applied does not take part in the reaction with the fiber and this proportion of unreacted dye is then removed from the goods by suitable operations, such as rinsing and/or soaping, if neecessary at high temperatures, for which purpose synthetic detergents can be used, e.g., alkyl-aryl-sulfonates such as sodium dodecylbenzene-sulfonate, alkyl sulfates such as sodium lauryl sulfate, or alkyl-, mono-alkylphenyl- or dialkylphenyl-polyglycol ethers which can be sulfated or carboxymethylated such as sodium laurylpolyglycol ether sulfate and sodium laurylpolyglycolether-oxyacetate.

In the examples the parts and percentages are by weight and the temperatures in degrees centigrade.

EXAMPLE 1

50.3 parts of 1-amino-4-(4'-methylamino-phenylamino)-anthraquinone-2,2'-disulfonic acid are mixed with 700 parts of water, and the amount of sodium hydroxide solution needed to dissolve the dye is added. The dye solution, at pH 7, is cooled to 5–10°. In the course of 45 minutes 21.5 parts of 2,4-dichloropyrimidine-5-carboxylic acid chloride are added, and simultaneously a sufficient volume of dilute sodium carbonate solution is dropped in to maintain the reaction mixture at a constant pH value of about 6. On completion of the reaction the pH value is adjusted to 7 with sodium carbonate solution and 120 parts of potassium chloride are added, upon which the reactive dye formed is precipitated. It is filtered off, washed with potassium chloride solution and dried in vacuum.

The blue dye obtained has the formula

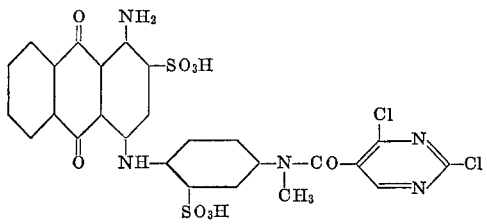

A cotton fabric is padded at room temperature with a freshly prepared solution of 15 grams of the dye of this example and 2.5 ml. of 30% sodium hydroxide solution per liter water, expressed to an increase of about 80% over the dry weight, and wrapped in a sheet of plastic, e.g., polyethylene, to prevent drying. After storage for 5 minutes at 25° the fabric is rinsed with cold and then with hot water, soaped at the boil for 10 minutes with a 0.3% soap solution in distilled water, rinsed again and dried. The reddish blue dyeing is very fast to light and wet treatments, especially washing, soda boiling, acid vapors, acetic acid cross-dyeing, rubbing and dry cleaning. The dyeing is stable to weak hypochlorite treatment and to crease resistant finishing.

When the sodium hydroxide solution used for fixation is replaced by 5 grams of sodium carbonate per liter, fixation is completed in 20 minutes at 25° or in 1 minute at 90°.

EXAMPLE 2

56.9 parts of a technical mixture of 1-amino-4-(4'-amino-phenylamino)-anthraquinone - 2,5,3' - trisulfonic acid and 1-amino-4-(4'-amino) - phenylamino-anthraquinone-2,8,3'-trisulfonic acid are stirred into 700 parts of water with the amount of sodium hydroxide solution necessary for dissolving. Over the next 30 minutes 22 parts of 2,4-dichloropyrimidine-5-carboxylic acid chlorine are added dropwise at 10–15°, during which time the pH of the reaction solution is maintained between 4 and 7 by strewing in 8 parts of sodium carbonate. When the chromatogram of a sample of the reaction mixture indicates that no further starting material is present, the reaction mixture is neutralized with sodium carbonate, and 90 parts of sodium chloride are added. Stirring is continued for 2 hours, then the dye is filtered off and dried carefully in vacuum. It is obtained as a dark blue powder which dissolves in water to give greenish blue solutions.

Fast dyeings and prints are obtained with this dye on cotton, mercerized cotton, spun rayon and other cellulosic fibers. Fixation is rapid and can be effected at room temperature as given in Example 1 or by a short steaming at 102–104°.

A mercerized cotton fabric is printed with a paste of the following composition:

| | Parts |
|---|---|
| The dye of this example | 30 |
| Urea | 100 |
| Water | 400 |
| Sodium alginate thickening, (4%) | 450 |
| Sodium 1-nitrobenzene-3-sulfonate | 10 |
| Sodium bicarbonate | 10 |
| | 1000 |

The print is dried and fixed by steaming for 1 minute at 102–104°, then rinsed in cold and hot water, soaped at the boil if necessary, rinsed again in hot and cold water and dried. A greenish blue print is obtained which has outstandingly good wet fastness properties and good stability to resin crease resistant finishing.

A similar, but slightly less soluble, dye is obtained when, in place of the 56.9 parts of the technical mixture of 1-amino-4-(4'-aminophenylamino) - anthraquinone - 2,5, 3'- and 2,8,3'-trisulfonic acid, 49 parts of 1-amino-4-(4'-aminophenylamino) - anthraquinone-2,3'-disulfonic acid are used and the same procedure followed.

When the 22 parts of 2,4-dichloropyrimidine-5-carboxylic acid chloride are replaced by 23.5 parts of 2,4-dichloro-6-methylpyrimidine-5-carboxylic acid chloride or by 36 parts of 2,4-dibromopyrimidine-5-carboxylic acid bromide, dye mixtures are obtained with which greenish blue dyeings and prints fast to light and wet treatments can be produced.

EXAMPLE 3

A solution of 56.5 parts of potassium 1-amino-4-(3'-aminophenylamino) - anthraquinone - 2,4' - disulfonate in 800 parts of water is prepared at 10–15°. In the course of 2 hours 21.5 parts of 2,4-dichloropyrimidine-5-carboxylic acid chloride are added dropwise with simultaneous dropwise addition of dilute sodium carbonate solution to maintain the pH value of the mixture between 5 and 7. When the reaction has run its course the mixture is neutralized and 80 parts of potassium chloride are added, causing the dye to be precipitated. It is filtered off and dried in vacuum to give a dark blue powder which dissolves in water with a brilliant blue coloration.

EXAMPLE 4

58.3 parts of 1-amino-4-(3'-amino-4'-methylphenylamino) - anthraquinone - 2,6,6' - trisulfonic acid are dissolved in 600 parts of water with the addition of an amount of sodium hydroxide solution sufficient to obtain the pH value 5–6. After cooling to 5–15°, a solution of 21.5 parts of 2,4-dichloropyrimidine-5-carboxylic acid chloride in 30 parts of acetone is run in slowly. The pH of the mixture is maintained at about 6 by adding sodium carbonate as required. On completion of the reaction the mixture is neutralized with sodium cabonate and 150 parts of sodium chloride are added. The precipitated dye is filtered off, washed with sodium chloride solution, dried in vacuum and ground. It is obtained as a blue powder which dissolves in water to give blue solutions and dyes cellulosic fibers in brilliant blue shades having outstandingly good light and wet fastness.

The dye is fixed on the fiber already at room temperature in a weakly alkaline medium.

A cotton fabric is padded at 20–25° with a 2% solution of the dye of this example, expressed to an increase of 70–80% over the dry weight, and dried. It is agitated in a solution of 300 grams per liter calcined sodium sulfate and 5 grams per liter calcined sodium carbonate for 20–30 minutes at 25° for fixation of the pad dyeing, and subsequently rinsed in cold and hot water, soaped at the boil for 10 minutes with a 0.3% soap solution, rinsed again and dried. A brilliant blue dyeing having outstanding light and wet fastness properties is obtained.

EXAMPLE 5

71 parts of sodium 1-amino-4-[4'-(4''-aminophenyl)-phenylamino]-anthraquinone-2,7,3''-trisulfonate are dissolved in 800 parts of water at 10°. 21.5 parts of 2,4-dichloropyrimidine-5-carboxylic acid chloride are added dropwise in 30 minutes, with simultaneous dropwise addition of dilute sodium carbonate solution to maintain the pH value of the mixture between 4 and 7. On completion of the reaction the dye is isolated in the normal way and vacuum dried under controlled conditions. A dark powder is obtained which dissolves in water to give green solutions.

When 23 parts of 2.4-dichloro-6-methylpyrimidine-5-carboxylic acid chloride are used in place of 21.5 parts of 2,4-dichloropyrimidine-5-carboxylic acid chloride, a very similar dye is obtained.

EXAMPLE 6

57.6 parts of copper phthalocyanine in 300 parts of chlorosulfonic acid are heated at 140° for 2 hours. The mass is discharged onto ice and the precipitated sulfonic acid chloride filtered off. The filter cake is stirred into 600 parts of ice water, then 15 parts of 1-amino-3-acetylaminobenzene are added and the suspension neutralized with dilute sodium hydroxide solution. 50 parts of sodium bicarbonate are added and the mixture stirred for 12 hours. It is then heated in the course of 1 hour to 60° and stirred further for 2 hours at this temperature. 250 parts of 36% hyrochloric acid are added and stirring continued for 3 hours at 85–90°. The precipitated intermediate is filtered off and washed well with 1% hydrochloric acid. The filter cake is stirred into 600 parts of water and the solution neutralized with sodium hydroxide solution and cooled to 0°. 23.5 parts of 2,4-dichloropyrimidine-5-carboxylic acid chloride are added and the pH value of the solution maintained between 6 and 7 by the gradual addition of dilute sodium carbonate solution, the temperature being held at 0° during this time. As soon as no further sodium carbonate solution is consumed, the condensation reaction is completed. The dye is precipitated by the addition of sodium chloride, filtered off and dried at 30° in vacuum. On grinding it is obtained as a blue powder which dissolves in water with a turquoise blue coloration and gives light- and wet-fast dyeings and prints on cotton and spun rayon.

When 10.5 parts of monoacetylethylene-diamine are used in place of 15 parts of 1-amino-3-acetylaminobenzene, a dye with very similar properties is obtained.

EXAMPLE 7

90 parts of copper phthalocyanine-4,4',4'',4'''-tetrasulfonic acid in 400 parts of chlorosulfonic acid are heated at 120° for 2 hours. The mass is run onto ice and the thereby precipitated sulfonic acid chloride filtered off. The filter cake is stirred into 600 parts of ice water, 28 parts of 1,3-diaminobenzene-4-sulfonic acid are added and the suspension neutralized with dilute sodium hydroxide soluiton. Then 80 parts of crystallized sodium acetate are added and the mass stirred for 12 hours. It is then heated to 60° in the course of 1 hour and stirred further till a clear solution is formed. The intermediate is precipitated by adding 200 parts of sodium chloride and 60 parts of 30% hydrochloric acid, filtered off and washed with acidified salt solution. The filter cake is stirred into 600 parts of water and neutralized by the addition of sodium hydroxide solution. The condensation reaction with 23.5 parts of 2,4-dichloropyrimidine-5-carboxylic acid chloride and the isolation of the final dye are carried out according to the particulars given in Example 6. The dye formed is a blue powder which dissolves in water with a turquoise blue coloration and gives light- and wet-fast turquoise dyeings and prints on cotton.

When 25 parts of 2,4-dichloro-6-methylpyrimidine-5-carboxylic acid chloride or 39 parts of 2,4-dibromo-6-methylpyrimidine-5-carboxylic acid bromide are used in place of 23.5 parts of 2,4-dichloropyrimidine-5-carboxylic acid chloride, dyes are obtained which also give turquoise dyeings and prints on cotton possessing good fastness to light and to wet treatments.

EXAMPLE 8

42.3 parts of 2-amino-5-hydroxy-6-phenylazonaphthalene-2',7-disulfonic acid are dissolved in 800 parts of water with the addition of 30% sodium hydroxide solution at a pH value of 5–6. The solution is cooled to 0–5° and 22 parts of 2,4-dichloropyrimidine-5-carboxylic acid chloride are added. This mixture is stirred for 2 to 3 hours at 0–5° and its pH value is maintained between 4.5 and 6 by the addition of dilute sodium cabonate solution. On completion of the reaction the condensation product is salted out, filtered off and dried in vacuum at 30° The dye is obtained as an orange-red powder which dissolves in water to give orange solutions. On cotton and spun rayon it gives orange dyeings and prints having good fastness to light, washing, perspiration, soda boiling, acid vapors, hypochlorite, chlorinated swimming pool water and acetic acid cross dyeing.

EXAMPLE 9

31.9 parts of 1-amino-8-hydroxynaphthalene-3,6-disulfonic acid are dissolved in 160 parts of water at 60° with the addition of dilute sodium hydroxide solution at a pH value of 4.8–5.0. The solution is cooled to 0–5° by external cooling and 22 parts of 2,4-dichloropyrimidine-5-carboxylic acid chloride are added dropwise. During this time the pH value of the reaction medium is maintained between 4 and 4.2 by dropwise addition of dilute sodium carbonate solution. On completion of the condensation reaction, the suspension obtained in the usual way by diazotization of 18.7 parts of 4-amino-1-methylbenzene-3- sulfonic acid is added to the reaction mixture. The pH value of the mixture is kept between 5 and 6 by adding sodium carbonate solution. The mixture is stirred overnight, after which the monoazo dye formed is precipitated with sodium chloride, filtered off, dried at 30°, and ground to give a red powder which dissolves in water with a red coloration.

When the 22 parts of 2,4-dichloropyrimidine-5-carboxylic acid chloride are replaced by 23.5 parts of 2,4-dichloro-6-methylpyrimidine-5-carboxylic acid chloride or by 36 parts of 2,4-dibromopyrimidine-5-carboxylic acid bromide, dyes with similar properties are obtained.

Mercerized cotton fabric is padded at room temperature with a solution of 20 grams per liter of the dye disclosed in this example, 100 grams per liter of urea, 10 grams per liter of sodium carbonate and 10 grams per liter of anhydrous sodium sulfate. The padded fabric is expressed to contain 75% of its weight of padding liquor and dried for 2 minutes at 110° It is then steamed for 20 seconds at 100–105°, soaped for 20 minutes at the boil in a 0.3% soap solution in distilled water (liquor ratio 1:40), rinsed in hot and cold water and dried. A red dyeing fast to light and wet treatments is obtained.

EXAMPLE 10

52.8 parts of the monoazo dye sodium 1-hydroxy-2-(2'-hydroxy - 5' - nitrophenylazo) - 8 - aminonaphthalene-3,6-disulfonate are suspended in 300 parts of water at 75°. A solution of 14.5 parts of crystallized cobalt sulfate in 40 parts of water is dropped into the suspension in 30 minutes. By simultaneous dropwise addition of dilute sodium carbonate solution the pH value of the reaction mass is maintained between 5 and 6. After the addition of the cobalt sulfate solution, stirring is continued for 1 hour at 75°. The cobalt complex compound formed is then precipitated by the addition of sodium chloride solution, filtered off and dissolved in 300 parts of water. 22.5 parts of 2,4-dichloropyrimidine-5-carboxylic acid chloride are added to the solution at 0° and its pH value is maintained between 3 and 4 by dropwise addition of dilute sodium carbonate solution. After stirring for 3 hours at 0° the condensation reaction is complete. Sodium chloride is added to precipitate the dye, which is then filtered off, and dried in vacuum. The dark powder obtained dissolves in water with a dark blue coloration.

Cotton cretonne is printed with a paste of the following composition:

| | Parts |
|---|---|
| The dye disclosed in this example | 65 |
| Urea | 50 |
| Water | 405 |
| Sodium alginate thickening (3%) | 450 |
| Sodium 1-nitrobenzene-3-sulfonate | 10 |
| Sodium carbonate | 20 |
| | 1000 |

The print is dried, steamed for 2 minutes at 102–104°, rinsed in cold and warm water, soaped at the boil, rinsed again and dried. A reddish black print is obtained which has good light fastness, good to vary good wet fastness properties (e.g., washing at 95°, soda boiling, perspiration, cross dyeing with acetic acid, and acid vapours) and excellent fastness to rubbing, hypochlorite, chlorinated swimming pool water and dry cleaning.

When the metallizing reaction is carried out with a chromium salt a dye is obtained which gives greenish black dyeings and prints on cotton having the same very good fastness to light, and to wet treatments as the cobalt complex dye.

EXAMPLE 11

The aminoazo dye, produced in the normal way by coupling the diazo compound of 26.9 parts of 2-amino-1-hydroxybenzene-4,6-disulfonic acid with 31.9 parts of 1-amino - 8 - hydroxynaphthalene - 3,6 - disulfonic acid and metallization with copper sulfate, is dissolved in the form of a moist paste in 1200 parts of water at 5°. A solution of 22.5 parts of 2,4-dichloropyrimidine-5-carboxylic acid chloride in 30 parts of acetone is run into this solution with stirring while the pH value of the reaction mass is maintained between 4.5 and 5.5 by regular additions of dilute sodium carbonate solution. On completion of the reaction the reactive dye formed is precipitated by adding sodium chloride, filtered off and washed with dilute sodium chloride solution. It is dried in vacuum at 30° and ground to give a dark powder which dissolves in water with a violet coloration and gives light- and wet-fast violet prints on cellulosic fiber materials.

EXAMPLE 12

The aminoazo dye used as starting dye is produced in the normal way by coupling the diazo compound of 23 parts of 1-amino-3-acetylaminobenzene-6-sulfonic acid with 32.3 parts 1-(2',5'-dichlorophenyl)-3-methyl-5-pyrazolone-4'-sulfonic acid and splitting off the acetyl group with hydrochloric acid. It is dissolved in the form of a moist paste in 800 parts of water at 60°. The temperature of the solution is reduced to 5° by external cooling, then 22 parts of 2,4-dichloropyrimidine-5-carboxylic acid chloride are slowly added with good stirring. The pH value of the reaction mass is kept between 5 and 6 by adding dilute sodium carbonate solution. When the reaction has run its course the condensation product is salted out, filtered off, and dried at 30° in vacuum. The dye is obtained as a yellow powder which dissolves in water with a yellow coloration. When applied to cotton by the one-bath padding process described in Example 9 it gives greenish yellow dyeings having very good fastness to light, washing, perspiration, soda boiling, acid vapors, acetic acid cross dyeing, rubbing and dry cleaning. They are resistant to crease resistant finishing and dischargeable. The same dye can be obtained by a different route as follows. 94 parts of 1,3-diaminobenzene-6-sulfonic acid are dissolved in 1500 parts of water at 20–25° and about 66 parts of 30% sodium hydroxide solution, the solution cooled to 0–5°, and a solution of 110 parts of 2,4-dichloropyrimidine-5-carboxylic acid chloride in 100 parts of acetone added dropwise in about 30 minutes with gradual simultaneous addition of 15% sodium carbonate solution to maintain the pH at 5–6. On completion of condensation the sodium 1-amino-3-(2',4'-dichloropyrimidyl-5'-carbonylamino)-benzene-6-sulofnate is salted out, filtered off with suction, washed with sodium chloride solution and vacuum dried at 50°.

38.5 parts of the sodium 1-amino-3-(2',4'-dichloropyrimidyl-5'-carbonylamino)-benzene-6-sulfonate are dissolved in 1000 parts of water with gentle heating, the solution cooled to 15–20° and adjusted to pH 7.5. A solution of 7 parts of sodium nitrite in 30 parts of water is added. The mixture is run into a mixture of 30 parts of 35% hydrochloric acid and 50 parts of ice, with the addition of further ice so that the temperature of the reaction mass does not exceed 5°. After stirring for some time any excess of nitrous acid is destroyed by adding aminosulfonic acid. The diazotizing mass is run slowly into a solution of 34.5 parts of sodium 1-(2',5'-dichlorophenyl)-3-methyl-5-pyrazolone-4'sulfonate in 350 parts of water, with the addition of sodium carbonate solution to maintain the coupling mixture neutral. On completion of coupling the dye is salted out, filtered off with suction and dried.

EXAMPLE 13

The aminoazo dye used as starting product is produced by coupling the diazo compound of 38.3 parts of 2-aminonaphthalene-4,6,8-trisulfonic acid with 18.7 parts of ω-sulfomethylaminobenzene and cleavage of the sulfomethyl group by means of sodium hydroxide solution. It is dissolved in 600 parts of water at 5° and the solution mixed with 22 parts of 2,4-dichloropyrimidine-5-carboxylic acid chloride with good stirring. Dilute sodium carbonate solution is added to maintain the pH value of the reaction mass between 5 and 6. On completion of the reaction the condensation product is salted out, filtered off and vacuum dried at 30°. The dye is a yellow powder giving yellow solutions in water. The yellow prints obtained with it on cellulosic fibers have good fastness to hypochlorite and chlorinated swimming pool water and very good fastness to light, washing at 95°, perspiration, cross dyeing with acetic acid, rubbing, and dry cleaning.

Dyes with similar properties are obtained when 23.5 parts of 2,4 - dichloro - 6 - methylpyrimidine-5-carboxylic acid chloride or 38 parts of 2,4-dibromo-6-methylpyridine-5-carboxylic acid bromide are used.

EXAMPLE 14

77.6 parts of the compound of the following constitution

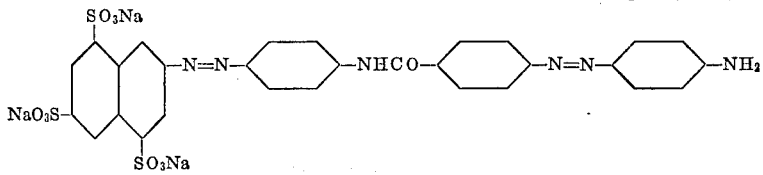

are dissolved in 600 parts of water at 80° and pH 6.5. The solution is cooled to 3–5° and 22 parts of 2,4-dichloropyrimidine-5-carboxylic acid chloride are added with simultaneous dropwise addition of sodium carbonate solution to maintain a constant pH value of 6–6.5. The reaction mixture is stirred at 3–5° until the amino group of the starting compound is no longer detectable by diazotization and coupling. The dye formed is salted out, filtered off and dried in vacuum. It dissolves in water with a yellow coloration and dyes cellulosic fibers to a deep bright yellow by padding or exhaustion dyeing processes.

The exhaustion dyeing method used for this dye is as follows: 100 parts of dry cotton fabric are entered at room temperature (20–25°) into a dyebath of 3000 parts of water and 2 parts of the dye of this example. To bring about absorption and fixation of the dye on the fiber, the following additions are made: after 10 minutes from the start of dyeing 60 parts of calcined sodium sulfate, after 20 minutes 60 parts of calcined sodium sulfate, after 30 minutes 3 parts of calcined sodium carbonate and after 40 minutes 3 parts of calcined sodium carbonate. Dyeing is continued for a further 80 minutes at room temperature, then the dyed material is removed from the bath, rinsed for 3 minutes in cold and 3 minutes in hot running water, soaped for 20 minutes in a boiling bath of 4000 parts of distilled water and 12 parts of olive oil soap, rinsed for 3 minutes in cold and 3 minutes in hot water, hydro-extracted and dried. A bright yellow dyeing fast to light and to wet treatments is obtained.

EXAMPLE 15

53.4 parts of the disodium salt of 4'-(3''-methyl-4''-aminobenzoylamino)-1.1'-azobenzene-4,3'-disulfonic acid are dissolved in 300 parts of lukewarm water. The solution is cooled to 20° with ice and 6.9 parts of sodium nitrite dissolved in a little water are added. The resulting solution is run with vigorous stirring into a mixture of 50 parts of 30% hydrochloric acid and 75 parts of ice, and stirring is continued at 5–10° until diazotization is completed. The diazo suspension obtained is mixed with the neutral solution of 41.4 parts of 2,4-dichloropyrimidine-5-carboxylic acid-(5'-hydroxy-7' - sulfo-2'-naphthyl)-amide in 1000 parts of water and coupling is carried out at pH 6 and 5–10° with the addition of sodium bicarbonate as acid-binding agent. The dye formed is then salted out, filtered off and dried. It dissolves in water with a scarlet coloration and when applied to cellulosic fibers by the padding or exhaustion dyeing processes it gives bright, deep scarlet dyeings. The dyeings are white dischargeable and have good fastness to light, soda boiling, washing at 95°, cross dyeing with acetic acid, and very good fastness to hypochlorite, chlorinated swimming pool water, acid vapors, and rubbing.

The coupling component used in this example is produced as follows: 120 parts of 2-amino-5-hydroxynaphthalene-7-sulfonic acid are dissolved in 2000 parts of water and 67 parts of 30% sodium hydroxide solution with gentle heating. On cooling to 5° a solution of 110 parts of 2,4-dichloropyrimidine-5-carboxylic acid chloride in 100 parts of acetone is added with good stirring. The pH value of the reaction mass is maintained between 4.5 and 5.5 by regular addition of aqueous sodium carbonate solution. When no further starting product is indicated the reaction product is salted out, filtered off with suction, washed with sodium chloride solution and dried.

EXAMPLE 16

68.5 parts of sodium 2-[4'-(4''-amino - 2'' - methylphenylazo)-2'-methyl - phenylazo] - naphthalene - 4,6,8-trisulfonate are dissolved in 800 parts of water at pH 5–6. The solution is cooled to 0–5° and 22 parts of 2,4-dichloropyrimidine-5 - carboxylic acid chloride are added. The mixture is stirred at 0–5° and its pH value maintained between 4.5 and 6 by the addition of dilute sodium carbonate solution. The dye formed is salted out, filtered off and dried in vacuum. It dissolves in water to give orange solutions and dyes cotton by the exhaustion dyeing process described in Example 14 in light- and wet-fast orange shades which are dischargeable.

In the following table further valuable dyes are listed which contain a 2,4-dihalogenopyrimidyl-5-carbonyl radical and which were produced according to the procedures set out in the above examples. They are characterized by the names of the corresponding dyes which contain no reactive radical; the amino groups reacted with a 2,4-dichloro-, 2,4-dibromo-, 2,4-dichloro-6-methyl- or 2,4-dibromo-6-methyl-pyrimidine-5-carboxylic acid chloride or bromide are italicized.

17—1-*amino*-7-(4'-methylphenylazo)-8-hydroxynaphthalene-4,6-disulfonic acid
18—1-hydroxy-2-(3'-*amino*phenylazo)-naphthalene-3,6,6'-trisulfonic acid
19—1-amino-4-[4'-(4''-*amino*phenyl)-phenylamino]-anthraquinone-2,6,3''-trisulfonic acid
20—Copper phthalocyanine sulfonic acid-disulfonic acid amidesulfonic acid-(4'-*amino*)-phenylamide
21—1-*amino*-7-(2'-methylphenylazo)-8-hydroxynaphthalene-3,6,5'-trisulfonic acid
22—1-*amino*-7-(2'-methylphenylazo)-8-hydroxynaphthalene-3,6,4'-trisulfonic acid
23—1-*amino*-7-(4'-methoxyphenylazo)-8-hydroxynaphthalene-3,6,6'-trisulfonic acid
24—1-*amino*-7-(3'-acetylaminophenylazo)-8-hydroxynaphthalene-3,6,6'-trisulfonic acid
25—1-*amino*-7-(3'-*amino*phenylazo)-8-hydroxynaphthalene-3,6,6'-trisulfonic acid
26—1-*amino*-7-(3'-*amino*-4'-methylphenylazo)-8-hydroxynaphthalene-3,6,6'-trisulfonic acid
27—1-*amino*-7-(3'-trifluoromethylphenylazo)-8-hydroxynaphthalene-3,6,6'-trisulfonic acid
28—1-*amino*-7-[4'-(6''-methylbenzothiazolyl-2'')-phenylazo]-8-hydroxynaphthalene-3,6,x''-trisulfonic acid
29—2-(4'-*amino*phenylazo)-naphthalene-4,8-disulfonic acid
30—2-(4'-*amino*-2'-acetylaminophenylazo)-naphthalene-4,8-disulfonic acid
31—2-(4'-*amino*-2'-sulfoacetylaminophenylazo)-naphthalene-4,8-disulfonic acid 32—2-(4'-*amino*-3'-carboxyphenylazo)-naphthalene-4,8-disulfonic acid
33—2-(4'-*amino*-2'-methylphenylazo)-naphthalene-5,7-disulfonic acid
34—1-phenyl-3-methyl-4-(3'''-*amino*phenylazo)-5-pyrazolone-2',6''-disulfonic acid
35—1-(4''-acetylamino-stilbenyl-4')-3-methyl-4-(3''''-*amino*phenylazo)-5-pyrazolone-2',2'',6'''-trisulfonic acid
36—1-(2',5'-dichlorophenyl)-3-methyl-4-[4''-(4''''-*amino*phenyl)-phenylazo]-5-pyrazolone-4',2''-disulfonic acid
37—α-(3''-*amino*phenylazo)-acetoacetylaminobenzene-4',6''-disulfonic acid
38—1-naphthyl-(2')-3-methyl-4-(4'''-*amino*phenylazo)-5-pyrazolone-5',7',2''-trisulfonic acid
39—1-(2',5'-dichlorophenyl)-3-methyl-4-(4''-*amino*phenylazo)-5-pyrazolone-4',2''-disulfonic acid
40—1-barbiturylazo-3-*amino*benzene-6-sulfonic acid
41—1-(2',5'-dichlorophenyl)-3-methyl-4-[4''-(4''''-*amino*-2''''-methylphenyl)-3''-methylphenylazo]-5-pyrazolone-4',6''-disulfonic acid
42—1-naphthyl-(2')-3-methyl-4-(3'''-*amino*phenylazo)-5-pyrazolone-4',8',6''-trisulfonic acid
43—1-phenyl-3-methyl-4-(4''-*amino*phenylazo)-5-pyrazolone-2',5',2''-trisulfonic acid
44—1-(3'*amino*phenylazo)-2-hydroxynaphthalene-6,6'-disulfonic acid
45—1-(3'-*amino*phenylazo)-2-hydroxynaphthalene-8,6'-disulfonic acid
46—1-(3'-*amino*phenylazo)-2-hydroxynaphthalene-6,8,6'-trisulfonic acid
47—1-(3'-*amino*phenylazo)-2-hydroxynaphthalene-3,6,6'-trisulfonic acid
48—1-(3'-*amino*phenylazo)-2-hydroxynaphthalene-3,6,8,6'-tetrasulfonic acid
49—1-hydroxy-2-(3'-*amino*phenylazo)-naphthalene-3,6'-disulfonic acid
50—1-hydroxy-2-(3'-*amino*phenylazo)-naphthalene-4,6'-disulfonic acid
51—1-hydroxy-2-(3'-*amino*phenylazo)-naphthalene-5,7,6'-trisulfonic acid
52—1-hydroxy-2-(3'-*amino*phenylazo)-naphthalene-3,8,6'-trisulfonic acid
53—1-hydroxy-2-(3'-*amino*phenylazo)-8-chloronaphthalene-3,6,6'-trisulfonic acid
54—1-hydroxy-2-(3'-*amino*phenylazo)-8-acetylaminonaphthalene-3,6,6'-trisulfonic acid
55—1-hydroxy-2-(3'-*amino*phenylazo)-8-(4''-chlorobenzoylamino)-naphthalene-3,6,6'-trisulfonic acid
56—1-hydroxy-2-(3'-*amino*phenylazo)-6-propionylamino-napthalene-3,6'-disulfonic acid
57—1-hydroxy-2-(3'-*amino*phenylazo)-7-propionylamino-naphthalene-3,6'-disulfonic acid
58—1-hydroxy-2-(3'-*amino*phenylazo)-7-*amino*naphthalene-3,6'-disulfonic acid
59—1-hydroxy-2-(3'-*amino*-4'-methylphenylazo)-naphthalene-4,6'-disulfonic acid
60—1-hydroxy-2-(3'-*amino*-4'-methylphenylazo)-naphthalene-3,6,6'-trisulfonic acid
61—1-(4'-*amino*phenylazo)-2-hydroxynaphthalene-8,2'-disulfonic acid
62—1-(4'-*amino*phenylazo)-2-hydroxynaphthalene-6,8,2'-trisulfonic acid
63—1-hydroxy-2-(4'-*amino*phenylazo)-naphthalene-3,2'-disulfonic acid
64—1-hydroxy-2-(4'-*amino*phenylazo)-8-acetylaminonaphthalene-3,5,2'-trisulfonic acid
65—1-hydroxy-2-(4'-*amino*phenylazo)-8-(3''-chlorobenzoylamino)-naphthalene-3,5,2'-trisulfonic acid
66—1-[4'-(4''-*amino*phenyl)-phenylazo]-2-hydroxynaphthalene-6,8,2'-trisulfonic acid
67—1-hydroxy-2-[4'-(4''-*amino*phenyl)-phenylazo]-naphthalene-3,6,2'-trisulfonic acid
68—1-hydroxy-2-[4'-(4'''-*amino*phenyl)phenylazo]-8-chloronaphthalene-3,6,2'-trisulfonic acid
69—1-hydroxy-2-[4'-(4'''-*amino*-2''-methylphenyl)-3'-methylphenylazo]-naphthalene-4,6'-disulfonic acid
70—1-hydroxy-2-[4'-(4'''-*amino*-2''-methylphenyl)-3'-methylphenylazo]-naphthalene-3,6,6'-trisulfonic acid
71—1-hydroxy-2-[4'-(4'''-*amino*-2''-methylphenyl)-3'-methylphenylazo]-naphthalene-3,8,6'-trisulfonic acid
72—1-[4'-(4''-*amino*-2''-methylphenyl)-3'-methylphenylazo]-2-amino-8-hydroxynaphthalene-6,6'-disulfonic acid
73—1-[4'-(4''-*amino*-2''-methylphenyl)-3'-methylphenylazo]-2-amino-8-hydroxynaphthalene-3,6,6'-trisulfonic acid
74—1-(4'-*amino*naphthyl-1'-azo)-4-naphthyl-(1'')-azo-naphthalene-6(7),6'(7'),5''-trisulfonic acid
75—4-(4'''-*amino*phenylazo)-4'-(4''''-phenylazo)-phenylazo-stilbene-2,2',4'''''-trisulfonic acid
76—4-*amino*-4'-(1''',2''-naphthylentriazol)-stilbene-2,2',4''-trisulfonic acid
77—1-amino-2-(4'-*amino*phenylazo)-7-phenylazo-8-hydroxynaphthalene-3,6,4''-trisulfonic acid
78—4-*amino*-4'-(4''-methoxynaphthyl-1''-azo)-stilbene-2,2'-disulfonic acid
79—1-(4'-*amino*benzoylamino)-7-phenylazo-8-hydroxynaphthalene-3,6,2''-trisulfonic acid
80—Copper complex compound of 1-hydroxy-2-(2'-hydroxy-5'-methylphenylazo)-6-*amino*naphthalene-3,4'-disulfonic acid
81—Copper complex compound of 1-hydroxy-2-(2'-hydroxynaphthyl-1'-azo)-6-*amino*naphthalene-3,4'-disulfonic acid
82—Copper complex compound of 1-hydroxy-2-(1'-hydroxynaphthyl - 2' - azo) - 8 - *amino*naphthalene - 3,6,4',6'-tetrasulfonic acid
83—Copper complex compound of 1-(2'-hydroxy-3'-*amino*phenylazo) - 2 - hydroxynaphthalene - 6,5' - disulfonic acid
84—Nickel complex compound of 1-hydroxy-2-(2'-hydroxyphenylazo) - 6 - *amino*naphthalene - 3,3',5' - trisulfonic acid
85—1:2 chromium complex compound of 1-hydroxy-2-(2' - hydroxy - 3' - chlorophenylazo) - 6 - *amino*naphthalene-3,5'-disulfonic acid
86—1:2 chromium complex compound of 1-(2'-hydroxyphenylazo) - 2 - hydroxy - 8 - *amino*naphthalene - 5'-sulfonic acid
87—1:2 cobalt complex compound of 1-phenyl-3-methyl-4 - (2'' - hydroxy - 3'' - *amino*phenylazo) - 5 - pyrazolone-4',5''-disulfonic acid
88—Mixed 1:2 chromium complex compound of 1-(2'-hydroxy - 3' - chlorophenylazo) - 2 - hydroxy - 8 - acetylaminonaphthalene-5'-sulfonic acid and 1-hydroxy-2-(2' - hydroxy - 3' - chlorophenylazo) - 6 - *amino*naphthalene-3,5'-disulfonic acid
89—1 - amino - 4 - (3' - *amino*phenylamino) - anthraquinone-2,7,4'-trisulfonic acid
90—1 - amino - 4 - 3' - *amino* - 6' - methylphenylamino)-anthraquinone-2,6,4'-trisulfonic acid
91—1 - amino - 4 - (3' - *amino* - 6' - methylphenylamino)-anthraquinone-2,7,4'-trisulfonic acid
92—1 - amino - 4 - [4'(4'' - *amino* - 2'' - methylphenyl)-3' - methylphenylamino] - anthraquinone - 2,8,5'' - trisulfonic acid
93—1 - amino - 4 - (4' - *methylamino*phenylamino) - anthraquinone-2,6,2'-trisulfonic acid
94—1 - amino - 4 - (3' - *methylamino* - 4' - methylphenylamino)-anthraquinone-2,5,6'-trisulfonic acid
95—Copper phthalocyanine-trisulfonic acid-sulfonic acid-(3'-*amino*)-phenylamide
96—Copper phthalocyanine-trisulfonic acid amide-sulfonic acid-(3'-*amino*)-phenylamide
97—Copper phthalocyanine-trisulfonic acid-sulfonic acid-(4'-*amino*-3'-sulfo)-phenylamide
98—Copper phthalocyanine - disulfonic acid-di-sulfonic acid-(4'-*amino*-3'-sulfo)-phenylamide 99—Copper phthalocyanine-trisulfonic acid-sulfonic acid-(2'-*amino*)-ethylamide
100—Mixed 1:2 chromium complex compound of 1-(2'-hydroxy - 5' - chlorophenylazo) - 2 - hydroxy - 8 - acetylamino-naphthalene-3'-sulfonic acid and 1-hydroxy-2 - (2' - hydroxy - 5' - chlorophenylazo) - 6 - *amino*naphthalene-3,3'-disulfonic acid
101—1:2 chromium complex compound of 1-hydroxy-2-(2' - hydroxy - 5' - chlorophenylazo) - 6 - *amino*naphthalene-3,3'-disulfonic acid
102—1:2 cobalt complex compound of 1-hydroxy-2-(2'-hydroxy - 5' - chlorophenylazo) - 6 - *amino*naphthalene-3,3'-disulfonic acid
103—1:2 chromium complex compound of 1-(2'-hydroxy - 3' - chlorophenylazo) - 2 - hydroxy - 8 - *amino*naphthalene-5'-sulfonic acid
104—1:2 cobalt complex compound of 1-hydroxy-2-(2'-hydroxy - 3' - chlorophenylazo) - 6 - *amino*naphthalene-3,5'-disulfonic acid
105—1:2 chromium complex compound of 1-(2'-hydroxy - 5' - nitrophenylazo) - 2 - hydroxy - 8 - *amino*naphthalene-3'-sulfonic acid
106—1:2 chromium complex compound of 1-(2'-hydroxy - 3' - nitrophenylazo) - 2 - hydroxy - 8 - *amino*naphthalene-5'-sulfonic acid
107—1:2 chromium complex compound of 1-hydroxy-2-(2' - hydroxy - 5' - nitrophenylazo) - 6 - *amino*naphthalene-3,3'-disulfonic acid
108—1:2 cobalt complex compound of 1-hydroxy-2-(2'-hydroxy - 5' - nitrophenylazo) - 6 - *amino*naphthalene-3,3'-disulfonic acid
109—1:2 chromium complex compound of 1-hydroxy-2-(2' - hydroxy - 3' - nitrophenylazo) - 6 - *amino*naphthalene-3,5'-disulfonic acid
110—1:2 cobalt complex compound of 1-hydroxy-2-(2'-hydroxy - 3' - nitrophenylazo) - 6 - *amino*naphthalene-3,5'-disulfonic acid
111—1:2 chromium complex compound of 1-(2'-hydroxyphenylazo) - 2 - hydroxy - 8 - *amino*naphthalene-3',5'-disulfonic acid
112—1:2 chromium complex compound of 1-hydroxy-2-(2' - hydroxy - 6' - nitronaphthyl - 1' - azo) - 6 - *amino*naphthalene-3,4'-disulfonic acid
113—1:2 cobalt complex compound of 1-hydroxy-2-(2'-hydroxy - 6' - nitronaphthyl - 1' - azo - 6 - *amino*naphthalene-3,4'-disulfonic acid
114—Mixed 1:2 chromium complex compounds of 1-(2'-hydroxy - 3' - nitrophenylazo) - 2 - hydroxy - 8 - *amino*naphthalene-5'-sulfonic acid and 1-hydroxy-2-(2'-hydroxy - 3' - chlorophenylazo) - 6 - *amino*naphthalene-3,5'-disulfonic acid
115—1:2 chromium complex compound of 1-hydroxy-2-(2' - hydroxynaphthyl - 1' - azo) - 6 - *amino*naphthalene-3,4'-disulfonic acid
116—1:2 chromium complex compound of 1-hydroxy-2-(2' - hydroxyphenylazo) - 6 - *amino*naphthalene - 3-sulfonic acid-5'-sulfonic acid amide
117—1 - hydroxy - 2 - (3' - *amino*phenylazo) - naphthalene-4,6,6'-trisulfonic acid
118—1-hydroxy - 2 - (3' - *amino*phenylazo) - naphthalene-4,7,6'-trisulfonic acid
119—1 - hydroxy - 2 - (3' - *amino*phenylazo) - naphthalene-3,5,7,6'-tetrasulfonic acid
120—1 - hydroxy - 2 - (3' - *amino*phenylazo) - naphthalene-3,6,6'-trisulfonic acid-8-sulfonic acid amide
121—Copper complex compound of 1-hydroxy-2-(2'-hydroxyphenylazo)-8-*amino*naphthalene-3,6,5'-trisulfonic acid
122—Nickel complex compound of 1-hydroxy-2-(2'-hydroxyphenylazo)-8-*amino*naphthalene-3,6,5'-trisulfonic acid
123—Copper complex compound of 1-hydroxy-2-(2'-hydroxy-5'-chlorophenylazo)-8-*amino*naphthalene-3,6,3'-trisulfonic acid
124—Copper complex compound of 1-hydroxy-2-(2'-hydroxy-3'-chlorophenylazo)-8-*amino*naphthalene-3,6,5'-trisulfonic acid
125—Copper complex compound of 1-hydroxy-2-(2'-hydroxy-5'-methylsulfonylphenylazo)-8-*amino*naphthalene-3,6-disulfonic acid
126—Copper complex compound of 1-hydroxy-2-(2'-hydroxyphenylazo)-8-*amino*naphthalene-3,6-disulfonic-5'-sulfonic acid amide
127—Copper complex compound of 1-hydroxy-2-(2'-hydroxyphenylazo)-8-*amino*naphthalene-3,5,5'-trisulfonic acid
128—Copper complex compound of 1-hydroxy-2-(2'-hydroxy-5'-methylsulfonylphenylazo)-8-*amino*naphthalene-3,5-disulfonic acid
129—Copper complex compound of 1-hydroxy-2-(2'-hydroxy-3'-carboxyphenylazo)-8-*amino*naphthalene-3,6,5'-trisulfonic acid
130—Copper complex compound of 1-hydroxy-2-(2'-hydroxyphenylazo)-8-*amino*naphthalene-3,5,3',5'-tetrasulfonic acid
131—Copper complex compound of 1-hydroxy-2-(2'-hydroxy-3'-carboxyphenylazo)-8-*amino*naphthalene-3,5,5'-trisulfonic acid
132—1-amino-4-(3'-*amino*phenylamino)-anthraquinone-2,6,4'-trisulfonic acid
133—1-(2'-chlorophenyl)-3-methyl-4-(3'''-*amino*phenylazo)-5-pyrazolone-5',6''-disulfonic acid
134—1-(2'-chloro-6'-methylphenyl)-3-methyl-4-(3''-*amino*phenylazo)-5-pyrazolone-6''-sulfonic acid
135—1-hydroxy-2-(3'-*amino*phenylazo)-naphthalene-4,8,6'-trisulfonic acid
136—2-*amino*-7-phenylazo-8-hydroxynaphthalene-6,2'-disulfonic acid
137—1-amino-4-(4'-*amino*phenylamino)-anthraquinone-2,6,3'-trisulfonic acid
138—4-*amino*-4'-(4''-methoxyphenylazo)-1,1'-stilbene-2,2'-disulfonic acid
139—1-hydroxy-2(3'-*amino*phenylazo)-7-(4''-nitrophenylazo)-8-aminonaphthalene-3,6,6'-trisulfonic acid
140—1-hydroxy-2-phenylazo-8-(3''-*amino*benzoylamino)-naphthalene-3,6,2'-trisulfonic acid
141—1-hydroxy-2-(4'-phenylazo-phenylazo)-6-*amino*naphthalene-3,2',4''-trisulfonic acid
142—1-hydroxy-2-(4'-methoxyphenylazo)-6-*methylamino*-naphthalene-3,2'-disulfonic acid
143—3-(4'-*amino*-3'-methoxy-5'-methylphenylazo)-pyrene-5,8(10)-disulfonic acid
144—1-hydroxy-2-phenylazo-8-(3''-*amino*benzoylamino)-naphthalene-3,6,2',4'-tetrasulfonic acid
145—1-hydroxy-2-phenylazo-8-*amino*naphthalene-3,6,2'-trisulfonic acid
146—Copper complex compound of 1-phenyl-3-methyl-4-2''-hydroxy-3''-*amino*phenylazo)-5-pyrazolone-2', 5',5''-trisulfonic acid
147—1:2 cobalt complex compound of 1-(2'-hydroxy-5'-nitrophenylazo)-2-hydroxy-3-*amino*naphthalene-7,3'-disulfonic acid
148—1:2 cobalt complex compound of 1-(2'-hydroxy-3'-chlorophenylazo)-2-hydroxy-3-*amino*naphthalene-7,5'-disulfonic acid
149—1:2 chromium complex compound of 1-hydroxy-2-(2'-hydroxy-5'-chlorophenylazo)-8-*amino*naphthalene-3,6-disulfonic acid
150—1:2 chromium complex compound of 1-hydroxy-2-(2'-hydroxyphenylazo)-8-*amino*naphthalene-3,5-disulfonic acid-5'-sulfonic acid amide
151—2-[4'-(4''-*amino*phenylazo)-phenylazo]-naphthalene-4,6,8-trisulfonic acid
152—2-(4'-*amino*-2'-methylphenylazo)-naphthalene-4,6,8-trisulfonic acid
153—2-(4'-*ethylamino*-2'-methylphenylazo)-naphthalene-4,6,8-trisulfonic acid
154—2-(4'-*methylamino*-2'-methoxyphenylazo)-naphthalene-4,8-disulfonic acid
155—1-phenyl-3-methyl-4-(3''-*amino*phenylazo)-5-pyrazolone-2',5',6''-trisulfonic acid 156—1-hydroxy-2-(4'-ethoxyphenylazo)-6-*amino*naphthalene-3,2'-disulfonic acid
157—2-(4'-*amino*-2',5'-dimethylphenylazo)-naphthalene-4,8-disulfonic acid
158—2-(4'-*amino*-3'-methylphenylazo)-naphthalene-3,6,8-trisulfonic acid
159—2-(4'-*amino*-2'-methyl-5'-methoxyphenylazo)-naphthalene-6,8-disulfonic acid
160—3-(4'-*amino*phenylazo)-pyrene-5,8(10)-disulfonic acid
161—3-(4'-*amino*-2'-methylphenylazo)-pyrene-5,8(10)-disulfonic acid
162—3-(4'-*amino*-2',5'-dimethylphenylazo)-pyrene-5,8(10)-disulfonic acid
163—2-[4'-(4''-*amino*-2'',5''-dimethylphenylazo)-2',5'-dimethylphenylazo]-naphthalene-4,6,8-trisulfonic acid
164—1-phenyl-3-methyl-4-(3''-*amino*phenylazo)-5-pyrazolone-4',6''-disulfonic acid
165—1-phenyl-3-carboxy-4-(3'-*amino*phenylazo)-5-pyrazoline-6'-sulfonic acid
166—1-(2'-chloro-6'-methylphenyl)-3-methyl-4-(3''-*amino*phenylazo)-5-pyrazolone-4',6''-disulfonic acid
167—1-phenyl-3-methyl-4-(4''-*amino*phenylazo)-5-pyrazolone-2',4',2''-trisulfonic acid
168—Copper complex compound of 1-(2'-chloro-6'-methylphenyl)-2-methyl-4-(2''-hydroxy-3''-*amino*phenylazo)-5-pyrazolone-4',5''-disulfonic acid
169—1-(4'-*amino*-2'-methylphenylazo)-4-phenylazobenzene-2,4''-disulfonic acid
170—2-(4'-*amino*-2'-methylsulfonylaminophenylazo)-naphthalene-4,8-disulfonic acid
171—2-[4'-(4''-*amino*-2''-methylphenylazo)-2'-methylphenylazo]-naphthalene-4,8-disulfonic acid
172—1-*amino*-3-methyl-4-[4'-(6''-methylbenzothiazolyl-2'')-phenylazo]-benzene-2'x''-disulfonic acid
173—Copper complex compound of 1-hydroxy-2-(2'-hydroxy-5'-phenylazo)-phenylazo-6-*amino*naphthalene-3,5,2'',5'''-tetrasulfonic acid
174—Copper complex compound of 1-hydroxy-2-[2'-hydroxy-4'-(2''-methoxyphenylazo)-phenylazo]-8-*amino*naphthalene-3,6,5''-trisulfonic acid
175—1:2-chromium complex compound of 1-phenyl-3-methyl-4-(2''-hydroxy-3''-*amino*phenylazo)-5-pyrazolone-3',5''-disulfonic acid
176—Copper complex compound of 1-(2',4'-dihydroxy-3'-phenylazophenylazo)-2-hydroxy-3-*amino*benzene-5,2'',4''-trisulfonic acid
177—1-*amino*-7-phenylazo-8-hydroxynaphthalene-2',3,6-trisulfonic acid
178—1-*amino*-7-phenylazo-8-hydroxynaphthalene-3,3',6-trisulfonic acid
179—1-*amino*-7-phenylazo-8-hydroxynaphthalene-4,4',6-trisulfonic acid
180—1-(2'-chlorophenyl)-3-methyl-4-(3''-*amino*phenylazo)-5-pyrazolone-5',6''-disulfonic acid
181—2-(4'-*amino*-2'-methylphenylazo)-naphthalene-4,6,8-trisulfonic acid
182—Copper complex compound of 1-hydroxy-2-(2'-hydroxy-3'-carboxyphenylazo)-8-*amino*naphthalene-3,6,5'-trisulfonic acid
183—1:2 chromium complex compound of 1-hydroxy-2-(2'-hydroxy-5'-methylaminosulfonylphenylazo)-8-*amino*naphthalene-3,6-disulfonic acid
184—1:2 cobalt complex compound of 1-(2'-hydroxy-5'-nitrophenylazo)-2-hydroxy-3-*amino*naphthalene-5,7-disulfonic acid
185—1:2 chromium complex compound of 1-hydroxy-2-(2'-carboxyphenylazo)-8-*amino*naphthalene-3,6-disulfonic acid
186—1:2 chromium complex compound of 1-hydroxy-2-(2'-carboxyphenylazo)-6-methyl*amino*naphthalene-3,4'-disulfonic acid
187—1:2 cobalt complex compound of 1-hydroxy-2-(2'-carboxyphenylazo)-6-*amino*naphthalene-3,4'-disulfonic acid
188—1-hydroxy-2-naphthyl-(2')-azo-6-*amino*naphthalene-3,4',8'-trisulfonic acid
189—1-hydroxy-2-naphthyl-(2')-azo-8-*amino*naphthalene-3,6,1',5'-tetrasulfonic acid
190—1-barbiturylamino-4-*amino*benzene-2-sulfonic acid
191—α-(4''-*amino*phenylazo)-acetoacetylamino-2'-naphthalene-4',8',2''-trisulfonic acid
192—α-(4''-*amino*phenylazo)-acetoacetylamino-benzene-3',2''-disulfonic acid
193—α-(Naphthyl-2''-azo)-acetoacetylamino-3'-*amino*benzene-4'',6'',8''-trisulfonic acid
194—α-(6''-*amino*naphthyl-2''-azo)-acetoacetylamino-naphthalene-4',4'',8''-trisulfonic acid
195—1-phenyl-3-methyl-4-(6''-*amino*naphthyl-2''-azo)-5-pyrazolone-2',5',4'',8''-tetrasulfonic acid
196—Copper complex compound of 1-phenyl-3-methyl-4-(1''-hydroxy-6''-*amino*naphthyl-2''-azo)-5-pyrazolone-2'4'4'',8''-tetrasulfonic acid
197—1-(3'-*amino*phenyl)-3-methyl-4-(naphthyl-2''-azo)-5-pyrazolone-4'',6'',8''-trisulfonic acid
198—4'-(4''-*amino*benzoylamino)-1,1'-azobenzene-2,5-disulfonic acid
199—1-hydroxy-2-(6'-*amino*naphthyl-2'-azo)-naphthalene-4,4',8'-trisulfonic acid
200—Copper complex compound of 1-hydroxy-2-(1'-hydroxy-6'-aminonaphthyl-2'-azo)-naphthalene-3,6,4',8'-tetrasulfonic acid
201—Copper complex compound of 1-(2'-methyl-4'-aminophenyl)-3-methyl-4-(1''-hydroxynaphthyl-2''-azo)-5-pyrazolene-4'',6'',8''-trisulfonic acid
202—1-hydroxy-2-(3'-*amino*phenylazo)-7-phenylazo-8-aminonaphthalene-3,6,6',3''-trisulfonic acid
203—1-hydroxy-2-phenylazo-7-(4''-*amino*phenylazo)-8-aminonaphthalene-3,5,3'-trisulfonic acid
204—1-hydroxy-2-(4'-*amino*phenylazo)-7-(4''-*amino*phenylazo)-8-aminonaphthalene-3,6,2'-trisulfonic acid
205—1-*amino*-2-methoxy-4-[(4'-phenylazo)-naphthyl-1'-azo]-5-methylbenzene-6',2'',5''-trisulfonic acid
206—1-hydroxy-2-(2'methoxy-4'-phenylazo-5'-*amino*phenylazo)-4-methylbenzene-2'',5''-disulfonic acid
207—1-phenyl-3-methyl-4-(3''-*amino*-4''-phenylazophenylazo)-5-pyrazolone-2',5',2''',5'''-tetrasulfonic acid
208—Copper complex compound of 1-phenyl-3-methyl-4-(2''-hydroxy-4''-phenylazo-5''-*amino*phenylazo)-5-pyrazolone-2',5',2''',5'''-tetrasulfonic acid
209—Copper complex compound of 1-hydroxy-2-(2'-hydroxy-4'-phenylazo-5'-*amino*phenylazo)-naphthalene-4,7,2'',4''-tetrasulfonic acid
210—1:2 cobalt complex compound of 1-hydroxy-2-[2',4'-dihydroxy-3'-(3''-*amino*phenylazo)-phenylazo]-4-chlorobenzene-6,6''-disulfonic acid
211—1-hydroxy-2-[4'-(naphthyl-1''-azo)-naphthyl-1'-azo]-8-*amino*naphthalene-3,6,6',4''-tetrasulfonic acid
212—1-hydroxy-2-[4'(naphthyl-2''-azo)-naphthyl-1'-azo]-8-*amino*naphthalene-3,5,5'',7''-tetrasulfonic acid
213—Copper complex compound of 1-hydroxy-2-[2'-hydroxy-4'-(naphthyl-2''-azo)-naphthyl-1'-azo]-8-*amino*-naphthalene-3,6,4'',8''-tetrasulfonic acid
214—4-(1'''-hydroxy-naphthyl-2''-azo)-4'-(2'''-methyl-4''''-*amino*phenylazo)-1,1'-diphenyl-2,2',4''-trisulfonic acid
215—4-(1''-hydroxynaphthyl-2''-azo)-4'-(2'''-methyl-4''''-*amino*-5''''-methoxyphenylazo)-2,2'-dimethyl-1,1'-diphenyl-5,5',4'',6''-tetrasulfonic acid
216—4-(1''-hydroxynaphthyl-2''-azo)-4'-(1''''-hydroxy-8''''-*amino*-naphthyl-2''''-azo)-2,2'-dimethyl-1,1'-diphenyl-5,4'',3''',6'''-tetrasulfonic acid
217—1-(3'-*amino*phenyl)-3-methyl-4-[4''-(phenylazo)-phenylazo]-5-pyrazolone-2'',4''-disulfonic acid
218—1-(2',5'-dichlorophenyl)-3-carboxy-4-(3''-*amino*phenylazo)-5-pyrazolone-4',6''-disulfonic acid
219—4-(1''-hydroxynaphthyl-2''-azo)-4'-(1''''-hydroxy-6''''-*amino*-naphthyl-2''''-azo)-2,2'-dimethyl-1,1'-diphenyl-3'',6'',8'',3'''-tetrasulfonic acid 220—α-(3″-*amino*phenylazo)-acetoacetylaminobenzene-3′,6″-disulfonic acid
221—α-(3″-*amino*phenylazo)-acetoacetylamino-2′-carboxybenzene-6″-sulfonic acid
222—α-(3″-*amino*phenylazo)-acetoacetylaminobenzene-4′-sulfonic acid amide-6″-sulfonic acid
223—α(3″-*amino*phenylazo)-acetoacetylamino-1′-naphthalene-4′,6″-disulfonic acid
224—α-(naphthyl-2″-azo)-acetoacetylamino-4′-*amino*benzene-4″,6″,8″-trisulfonic acid
225—α-(6′-*amino*naphthyl-2″-azo)-acetoacetylamino-2′-naphthalene-4′,8′,4″,8″-tetrasulfonic acid
226—1-hydroxy-2-(3′-*amino*phenylazo)-naphthalene-4,6,6′-trisulfonic acid
227—1-hydroxy-2-(6′-*amino*naphthyl-2′-azo)-8-acetylaminonaphthalene-3,6,4′,8′-tetrasulfonic acid Of the copper phthalocyanine dyes of Examples 20, 95 to 99, those of Examples 20, 95 and 99 are derivatives of copper phthalocyanine-4,4′,4″,4‴-tetrasulfonic acid and those of Examples 96, 97 and 98 are derivatives of copper phthalocyanine-3,3′,3″,3‴-tetrasulfonic acid.

In the dyes of Examples 17 to 227 the reactive groups bound to the italicized amino group are the following:

2,4-dichloropyrimidyl-5-carbonyl in Examples 23, 25–41, 43–46, 56–67, 71–82, 87, 88, 91–94, 96–110, 115, 116, 118–128, 131, 132, 134–144, 146–149, 151–154, 158–160, 168–187, 192–203, 209–219, 221–224 and 226

2,4-dibromopyrimidyl-5-carbonyl in Examples 24, 47, 89, 117, 145 and 161

2,4-dichloro-6-methylpyrimidyl-5-carbonyl in Examples 17–21, 42, 49–55, 68–70, 83–86, 90, 111–114, 129, 130, 150, 156, 157, 162–167, 188, 190–191, 204–208, 220, 225 and 227

2,4-dibromo-6-methylpyrimidyl-5-carbonyl in Examples 22, 48, 95, 133, 155 and 189.

The dyeings on cotton obtained with the dyes of the foregoing Examples of the table are of the following shade:

| No. of dye— | Shade |
| --- | --- |
| 17 | Bluish red. |
| 18 | Reddish orange. |
| 19 | Blue. |
| 20 | Turquoise blue. |
| 21 | Bluish red. |
| 22 | Do. |
| 23 | Do. |
| 24 | Do. |
| 25 | Do. |
| 26 | Ruby. |
| 27 | Red. |
| 28 | Violet. |
| 29 | Yellow. |
| 30 | Reddish yellow. |
| 31 | Do. |
| 32 | Do. |
| 33 | Do. |
| 34 | Greenish yellow. |
| 35 | Yellow. |
| 36 | Yellowish orange. |
| 37 | Greenish yellow. |
| 38 | Reddish Yellow. |
| 39 | Golden yellow. |
| 40 | Greenish yellow. |
| 41 | Do. |
| 42 | Yellow. |
| 43 | Reddish yellow. |
| 44 | Orange. |
| 45 | Do. |
| 46 | Do. |
| 47 | Do. |
| 48 | Orange-red. |
| 49 | Orange. |
| 50 | Orange-red. |
| 51 | Yellowish red. |
| 52 | Red. |
| 53 | Scarlet. |
| 54 | Bluish red. |
| 55 | Do. |
| 56 | Orange. |
| 57 | Yellowish red. |
| 58 | Do. |
| 59 | Scarlet. |
| 60 | Red. |
| 61 | Do. |
| 62 | Do. |
| 63 | Do. |
| 64 | Bordeaux. |
| 65 | Do. |
| 66 | Red. |
| 67 | Bluish red. |
| 68 | Do. |
| 69 | Scarlet. |
| 70 | Red. |
| 71 | Do. |
| 72 | Do. |
| 73 | Do. |
| 74 | Red-brown. |
| 75 | Brownish orange. |
| 76 | Greenish yellow. |
| 77 | Dark green. |
| 78 | Reddish yellow. |
| 79 | Red. |
| 80 | Violet-red. |
| 81 | Violet-blue. |
| 82 | Violet. |
| 83 | Blue-red. |
| 84 | Red-brown. |
| 85 | Reddish Navy blue. |
| 86 | Gray. |
| 87 | Brown. |
| 88 | Reddish Navy blue. |
| 89 | Reddish blue. |
| 90 | Do. |
| 91 | Reddish blue. |
| 92 | Blue. |
| 93 | Do. |
| 94 | Reddish blue. |
| 95 | Turquoise blue. |
| 96 | Do. |
| 97 | Do. |
| 98 | Do. |
| 99 | Do. |
| 100 | Reddish Navy blue. |
| 101 | Navy Blue. |
| 102 | Brownish violet. |
| 103 | Gray. |
| 104 | Brownish violet. |
| 105 | Greenish gray. |
| 106 | Gray. |
| 107 | Reddish Navy blue. |
| 108 | Brown. |
| 109 | Reddish Navy blue. |
| 110 | Brownish violet. |
| 111 | Gray. |
| 112 | Navy blue. |
| 113 | Brownish violet. |
| 114 | Reddish Navy blue. |
| 115 | Navy blue. |
| 116 | Reddish Navy blue. |
| 117 | Yellowish red. |
| 118 | Do. |
| 119 | Red-orange. |
| 120 | Red. |
| 121 | Violet. |
| 122 | Reddish violet. |
| 123 | Bluish violet. |

| No. of dye | Shade |
|---|---|
| 124 | Violet. |
| 125 | Reddish violet. |
| 126 | Violet. |
| 127 | Reddish violet. |
| 128 | Do. |
| 129 | Violet. |
| 130 | Reddish violet. |
| 131 | Do. |
| 132 | Blue. |
| 133 | Greenish yellow. |
| 134 | Do. |
| 135 | Red. |
| 136 | Yellowish red. |
| 137 | Blue. |
| 138 | Reddish yellow. |
| 139 | Black. |
| 140 | Red. |
| 141 | Do. |
| 142 | Scarlet. |
| 143 | Red-orange. |
| 144 | Red. |
| 145 | Do. |
| 146 | Orange-brown. |
| 147 | Brown. |
| 148 | Do. |
| 149 | Navy blue. |
| 150 | Do. |
| 151 | Orange. |
| 152 | Reddish yellow. |
| 153 | Do. |
| 154 | Do. |
| 155 | Greenish yellow. |
| 156 | Scarlet. |
| 157 | Yellow. |
| 158 | Do. |
| 159 | Yellow. |
| 160 | Red-orange. |
| 161 | Do. |
| 162 | Do. |
| 163 | Orange. |
| 164 | Greenish yellow. |
| 165 | Reddish yellow. |
| 166 | Greenish yellow. |
| 167 | Yellow. |
| 168 | Orange-brown. |
| 169 | Yellow-brown. |
| 170 | Reddish yellow. |
| 171 | Brownish yellow. |
| 172 | Orange-yellow. |
| 173 | Bordeaux. |
| 174 | Gray-violet. |
| 175 | Red-brown. |
| 176 | Brown. |
| 177 | Red. |
| 178 | Do. |
| 179 | Do. |
| 180 | Greenish yellow. |
| 181 | Reddish yellow. |
| 182 | Violet. |
| 183 | Navy blue. |
| 184 | Brown. |
| 185 | Navy blue. |
| 186 | Violettish brown. |
| 187 | Brown. |
| 188 | Orange. |
| 189 | Bluish red. |
| 190 | Yellow. |
| 191 | Do. |
| 192 | Do. |
| 193 | Do. |
| 194 | Do. |
| 195 | Orange yellow. |
| 196 | Red. |
| 197 | Orange yellow. |
| 198 | Yellow. |
| 199 | Red. |
| 200 | Navy blue. |
| 201 | Red. |
| 202 | Blue-gray. |
| 203 | Greenish gray. |
| 204 | Dark green. |
| 205 | Red-brown. |
| 206 | Yellow-brown. |
| 207 | Do. |
| 208 | Black. |
| 209 | Bluish black. |
| 210 | Brown. |
| 211 | Blue. |
| 212 | Do. |
| 213 | Navy blue. |
| 214 | Scarlet. |
| 215 | Red. |
| 216 | Bluish red. |
| 217 | Reddish yellow. |
| 218 | Greenish yellow. |
| 219 | Red. |
| 220 | Yellow. |
| 221 | Do. |
| 222 | Do. |
| 223 | Do. |
| 224 | Do. |
| 225 | Do. |
| 226 | Scarlet. |
| 227 | Red. |

Formulae of representative dyes of the foregoing examples are as follows:

EXAMPLE 1

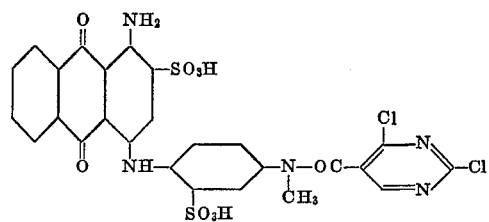

EXAMPLE 2

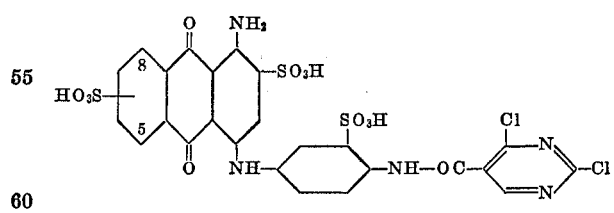

last paragraph

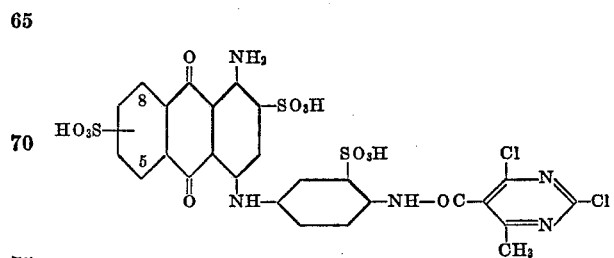

EXAMPLE 3
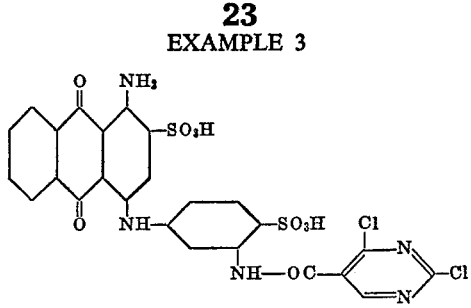
EXAMPLE 4
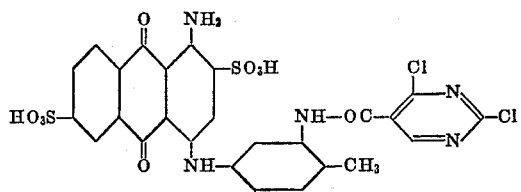
EXAMPLE 5
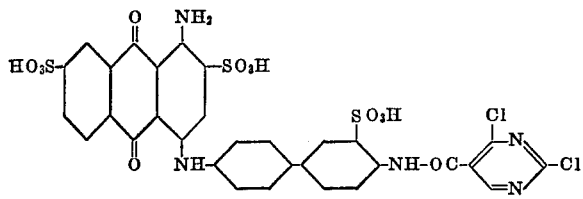
EXAMPLE 6
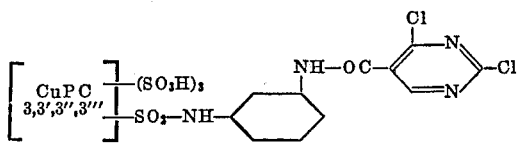
EXAMPLE 7
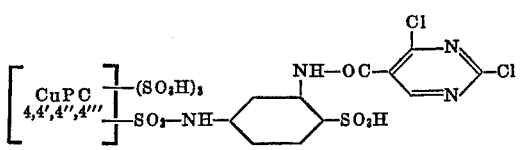
last paragraph
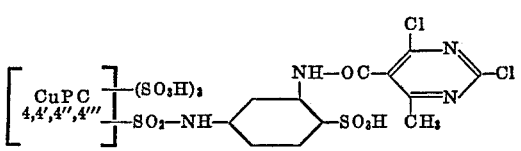
EXAMPLE 8
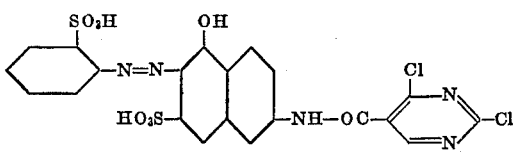
EXAMPLE 9
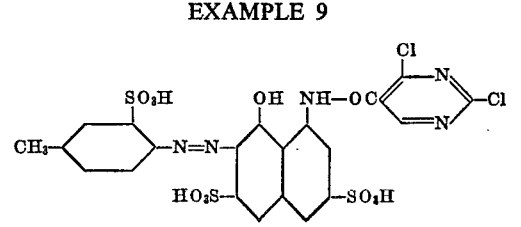
second paragraph
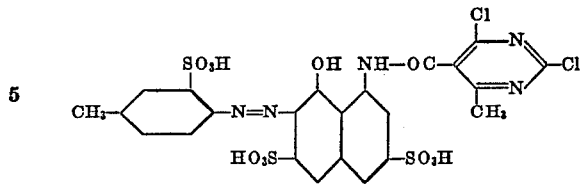
EXAMPLE 10
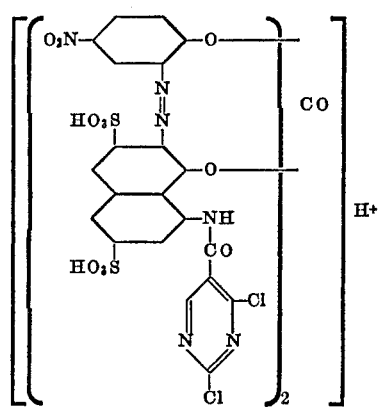
last paragraph
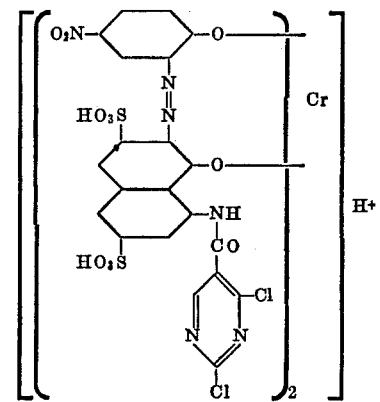
EXAMPLE 11
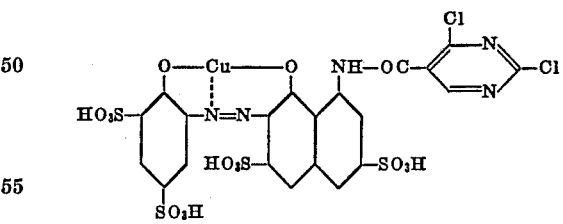
EXAMPLE 12
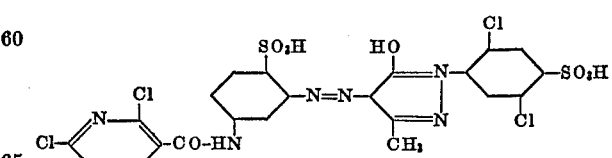
EXAMPLE 13
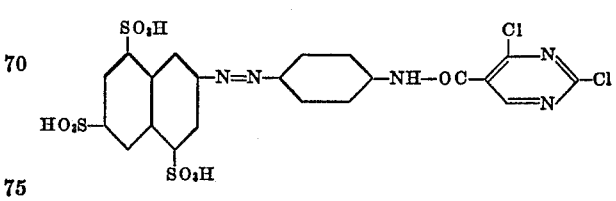

last paragraph
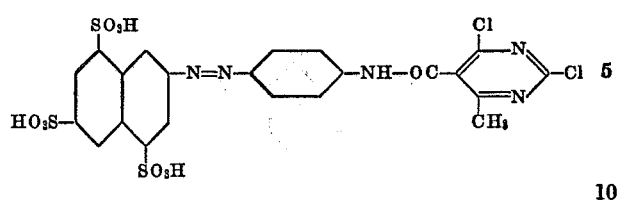
EXAMPLE 121
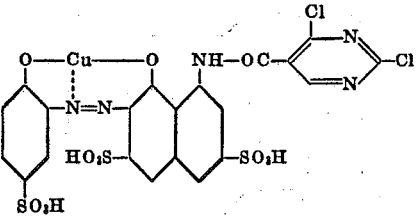
EXAMPLE 14
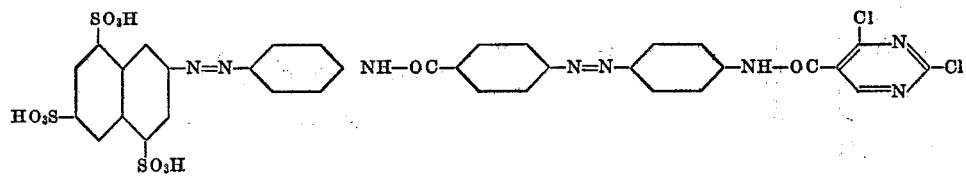
EXAMPLE 15
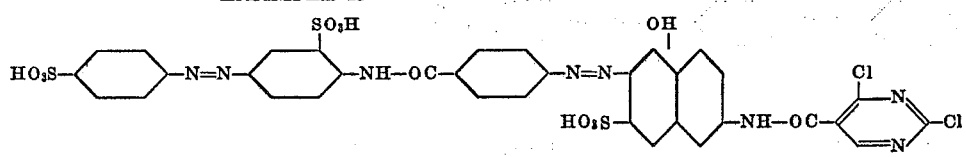
EXAMPLE 16
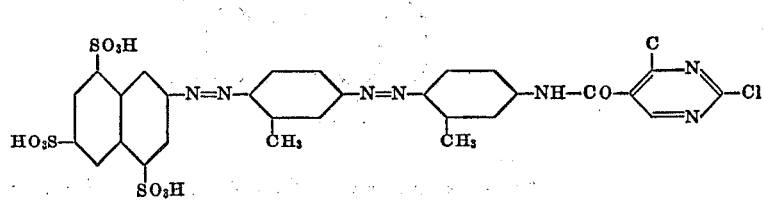
EXAMPLE 43
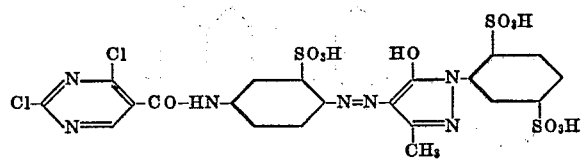
EXAMPLE 146
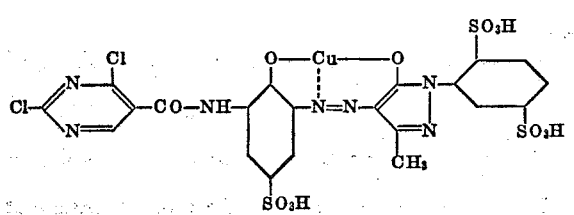
EXAMPLE 46
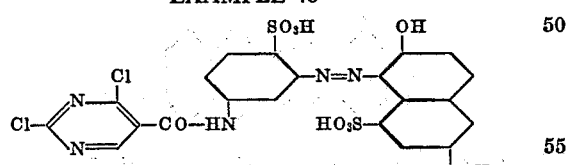
EXAMPLE 82
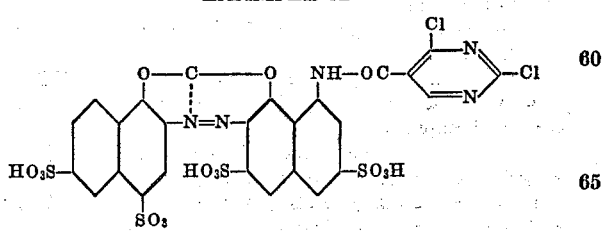
EXAMPLE 147
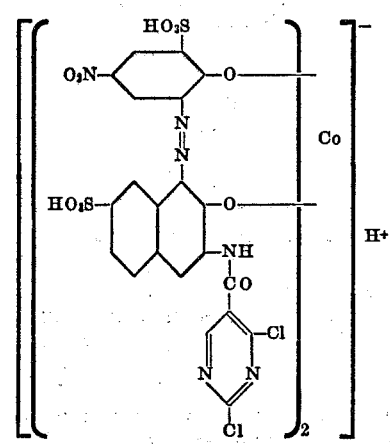
EXAMPLE 118
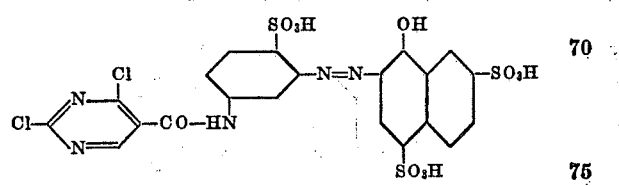

EXAMPLE 149

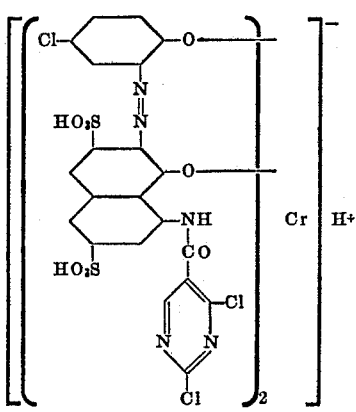

EXAMPLE 151

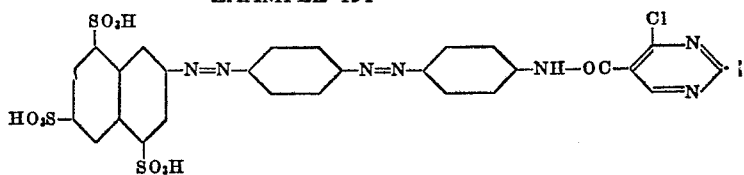

EXAMPLE 177

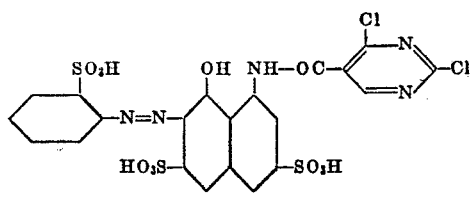

I claim:
1. Fiber reactive dye of the formula

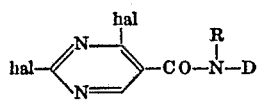

wherein
R is a member selected from the group consisting of hydrogen and methyl;
hal is a member selected from the group consisting of chloro and bromo;
D is a member selected from the group consisting of $D^1$, $D^2$, $D^3$ and $D^4$;
$D^1$ is a member selected from the group consisting of —WXY and —WZ, wherein:
W is

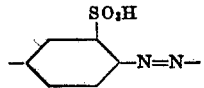

X is

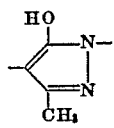

Y is a member selected from the group consisting of 2,5 - dichloro - 4 - sulfophenyl, 2,5 -disulfophenyl and 5,7-disulfonaphthyl-2-;
Z is a member selected from the group consisting of 2-hydroxy-8-sulfonaphthyl, 2-hydroxy-6,8-disulfonaphthyl, 1-hydroxy - 3 -sulfonaphthyl-2-, 1 - hydroxy-8-methylcarbamido-3,5-disulfonaphthyl-2- and 1-hydroxy-8-(3'-chlorophenyl)-carbamido-3,5-disulfonaphthyl-2-;

$D^2$ is a member selected from the group consisting of:

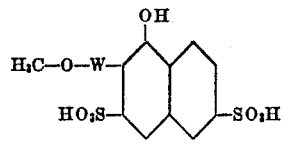

and

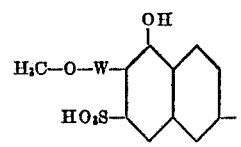

$D^3$ is

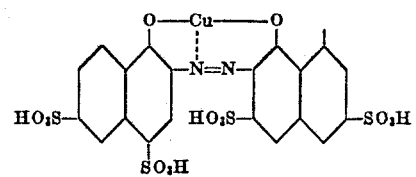

and
$D^4$ is a member selected from the group consisting of

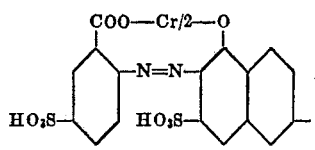

and

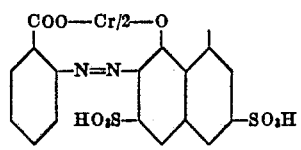

2. A dye according to claim 1 wherein D is —WXY.
3. A dye according to claim 2 wherein Y is 2,5-dichloro-4-sulfophenyl.
4. A dye according to claim 2 wherein Y is 5,7-disulfonaphthyl-2-.
5. A dye according to claim 1 wherein D is —WZ.
6. A dye according to claim 5 wherein Z is 2-hydroxy-6,8-disulfonaphthyl.
7. A dye according to claim 5 wherein Z is 1-hydroxy-8-methylcarbamido-3,5-disulfonaphthyl-2-.
8. A dye according to claim 5 wherein Y is 1-hydroxy-8-(3'-chlorophenyl)-carbamido-3,5-disulfonaphthyl-2-.
9. A dye according to claim 1 wherein D is

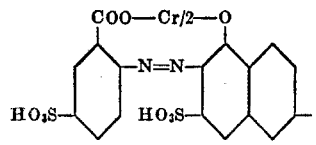

10. A dye according to claim 1 wherein D is
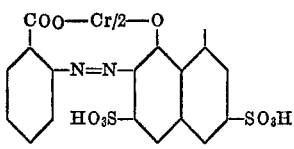
11. The reactive dye of the formula
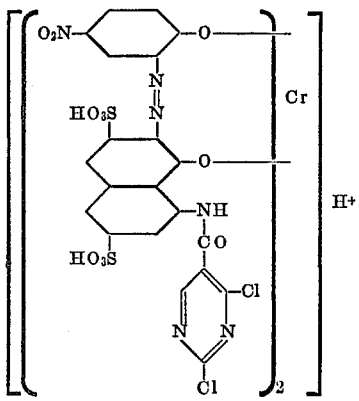
12. The reactive dye of the formula
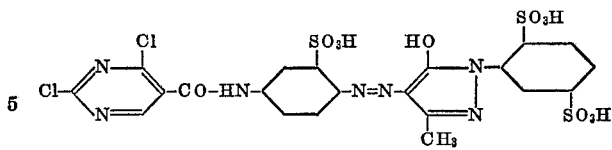
13. The reactive dye of the formula
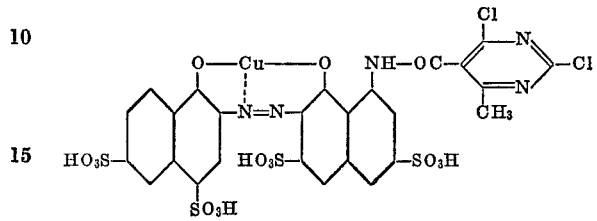
References Cited
FOREIGN PATENTS
1,247,660 10/1960 France.
903,048 8/1962 Great Britain.
FLOYD D. HIGEL, Primary Examiner
U.S. Cl. X.R.
8—4, 40, 41, 42, 50, 51, 63, 71; 106—288; 117—138.8, 141, 143; 260—37, 40, 41, 154, 242, 246, 251, 256.4, 261

UNITED STATES PATENT OFFICE
CERTIFICATE OF CORRECTION

Patent No. 3,458,496          Dated July 29, 1969

Inventor(s) JACQUES GUENTHARD

It is certified that error appears in the above-identified patent and that said Letters Patent are hereby corrected as shown below:

Column 1, line 69, "i.e., is chlorine" should read --i.e., chlorine--. Column 5, line 22, "printing, or it" should read --printing, it--. Column 9, line 60, "vary" should read --very-- Column 15, line 46, "compounds" should read --compound--. Column 17, line 26, "2-methyl" should read --3-methyl--. Column 18, lin 39, "2'methoxy" should read --2'-methoxy--. Column 25, between lines 65 and 70, on the right ring of the left naphthalene nucleus, "$SO_3$" should read --$SO_3H$--. Column 26, in the formula for EXAMPLE 15, the naphthalene nucleus should read:

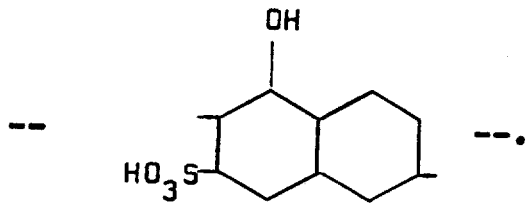

Column 28, line 5, the right ring of the naphthalene nucleus should read:

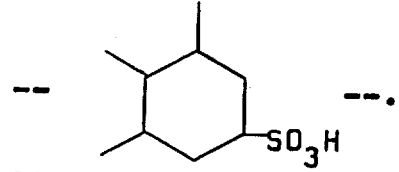

Column 30, line 12, the extreme right ring in the formula of claim 13 should read:

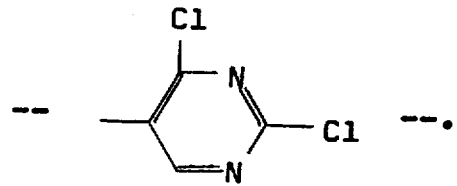

SIGNED AND SEALED
JUN 2 1970

(SEAL)
Attest:

Edward M. Fletcher, Jr.
Attesting Officer

WILLIAM E. SCHUYLER, JR.
Commissioner of Patents